United States Patent [19]

Yamada et al.

[11] 4,336,308

[45] Jun. 22, 1982

[54] MAGNETIC RECORDING MEDIA

[75] Inventors: Yasuyuki Yamada; Kenichi Masuyama; Nobuo Tsuji, all of Odawara, Japan

[73] Assignee: Fuji Photo Film Co., Ltd., Kanagawa, Japan

[21] Appl. No.: 74,467

[22] Filed: Sep. 11, 1979

[30] Foreign Application Priority Data

Sep. 11, 1978 [JP] Japan .............................. 53/111580

[51] Int. Cl.³ ................................................ G11B 5/70
[52] U.S. Cl. .............................. 428/425.9; 252/62.54; 360/134; 428/522; 428/694; 428/900
[58] Field of Search .............. 428/900, 539, 694, 695, 428/520, 522, 425.9, 424.7; 427/128, 127; 360/134, 135, 136; 252/62.54

[56] References Cited

U.S. PATENT DOCUMENTS

| | | | |
|---|---|---|---|
| 3,630,771 | 12/1971 | Akashi et al. | 252/62.54 |
| 3,634,137 | 10/1972 | Akashi et al. | 427/128 |
| 3,650,828 | 3/1972 | Higashi et al. | 428/425.9 |
| 3,681,137 | 8/1972 | Naguzano et al. | 252/62.54 |
| 3,922,439 | 11/1975 | Hartmann et al. | 428/900 |
| 3,926,826 | 12/1975 | Graham et al. | 252/62.54 |
| 4,020,227 | 4/1976 | Defeyes | 428/900 |
| 4,049,871 | 9/1977 | Ogawa et al. | 428/900 |
| 4,152,484 | 5/1979 | Bachmann et al. | 428/900 |
| 4,172,176 | 10/1979 | Tanaka et al. | 428/900 |
| 4,196,258 | 4/1980 | Huismin et al. | 252/62.54 |

FOREIGN PATENT DOCUMENTS

| | | | |
|---|---|---|---|
| 2236080 | 2/1974 | Fed. Rep. of Germany | 427/128 |
| 45-14500 | 5/1970 | Japan | 427/128 |
| 47-28046 | 7/1972 | Japan | 427/128 |
| 47-28048 | 7/1972 | Japan | 427/128 |
| 47-31443 | 8/1972 | Japan | 428/900 |
| 47-31444 | 8/1972 | Japan | 427/128 |
| 51-10908 | 1/1976 | Japan | 427/128 |
| 51-10911 | 1/1976 | Japan | 427/128 |
| 51-31484 | 9/1976 | Japan | 427/128 |
| 54-5281 | 3/1979 | Japan | 427/128 |
| 54-151416 | 11/1979 | Japan | 428/425.9 |
| 627528 | 8/1978 | U.S.S.R. | 428/900 |

*Primary Examiner*—Stanley S. Silverman
*Attorney, Agent, or Firm*—Sughrue, Mion, Zinn, Macpeak and Seas

[57] ABSTRACT

A magnetic recording medium and, more particularly, a magnetic recording medium based on a magnetic composition exhibiting high dispersibility of finely divided ferromagnetic powders and having excellent abrasion resistance is disclosed wherein the binder for the magnetic composition contains a 2-chloroacrylonitrile polymer and a thermoplastic polyurethane resin; in another embodiment of the invention the binder additionally contains a polyisocyanate.

24 Claims, No Drawings

MAGNETIC RECORDING MEDIA

BACKGROUND OF THE INVENTION

1. Field of the Invention

The present invention relates to binders for magnetic recording media and, particularly, to compositions which show high dispersibility for finely-divided ferromagnetic powders and have excellent abrasion resistance.

2. Description of the Prior Art

Hitherto, as binders having the above described properties, cellulose derivatives, vinyl chloride-vinyl acetate copolymers, polyurethane resins, acrylic resins and copolymers thereof, vinylidene chloride polymers and copolymers, synthetic rubbers and polyesters, etc. have been used alone or as mixtures. Nitrocellulose which is a cellulose derivative disperses finely-divided ferromagnetic pigments quite well and imparts suitable magnetic tape characteristics when used as the binder for magnetic tapes. Nitrocellulose, however, has handling problems due to its character. Namely, it is capable of spontaneous combustion and it is very flammable. Further, copolymers composed mainly of vinyl chloride, for example, vinyl chloride-vinyl acetate copolymers, are not satisfactory in terms of their ability to disperse magnetic pigments, and other combinations of binders do not have sufficiently high dispersibility for magnetic materials and abrasion resistance.

SUMMARY OF THE INVENTION

An object of the present invention is to overcome the above described drawbacks of the prior art binders and to provide: A magnetic recording medium having excellent surface property. A magnetic recording medium having a magnetic layer which has good dispersibility to magnetic materials and an excellent B-H character. A magnetic recording medium in which the magnetic layer has high durability and, particularly, the occurrence of drop-out due to abrasion is very small. A magnetic recording medium in which deterioration of the magnetic layer with time is very small. A magnetic recording medium having low temperature and humidity dependency. A magnetic recording medium in which the adhesion of the layer to the base is excellent. A magnetic recording medium in which abrasion loss due to the magnetic head is small. A magnetic recording medium having a low coefficient of friction. A magnetic recording medium having excellent signal-to-noise ratio.

As a result of various studies of 2-chloroacrylonitrile polymers which have been known for use in magnetic tapes, it has been found that they exhibit excellent dispersibility for magnetic pigments but have poor durability, but if they are used together with thermoplastic polyurethane resins, tapes which meet the above described object of the present invention can be obtained. Namely, the present invention relates to magnetic recording media having a magnetic layer which is prepared by dispersing a finely-divided ferromagnetic powder in a binder and applying to a base, in which the binder is a combination of 2-chloroacrylonitrile polymers and thermoplastic polyurethane resins.

It has further been found that, it is possible to produce magnetic recording media having excellent abrasion resistance by adding polyisocyanate compounds to the above described composition to form a three-dimensional network structure and improve heat resistance.

DETAILED DESCRIPTION OF THE INVENTION

The 2-chloroacrylonitrile polymers used in the present invention are homopolymers or copolymers of 2-chloroacrylonitrile ($\alpha$-chloroacrylonitrile, $CH_2=CClCN$, molecular weight: 87.51). The 2-chloroacrylonitrile copolymers may contain up to about 30 mol% of a comonomer such as vinyl chloride, vinyl acetate, vinylidene chloride, acrylonitrile, an alkyl ($C_{1-8}$) acrylate or methacrylate such as ethyl acrylate, propyl acrylate, butyl acrylate, amyl acrylate, hexyl acrylate, heptyl acrylate, methyl methacrylate, ethyl methacrylate, propyl methacrylate, butyl methacrylate, amyl methacrylate, hexyl methacrylate, heptyl methacrylate, octyl methacrylate etc. The 2-chloroacrylonitrile polymers have a weight average molecular weight of about 10,000 to 300,000 and preferably about 20,000 to 100,000. If the molecular weight thereof is less than 10,000, though the dispersibility of magnetic powders is excellent and magnetic recording media having excellent signal-to-noise ratio can be obtained, physical strength is poor and abrasion resistance of the magnetic layers is inferior. On the other hand, if the molecular weight is more than 300,000, dispersibility of magnetic particles is inferior and compatability with other resins deteriorates resulting in deterioration of the signal-to-noise ratio.

As the thermoplastic polyurethane resins used in the present invention, there are polyester polyurethanes and polyester polyurethanes which are produced by reacting polyester polyols or polyether polyols with diisocyanate compounds such as tolylenediisocyanate, 4,4'-diphenylmethane diisocyanate, hexamethylene diisocyanate or metaxylene diisocyanate, etc. The polyester polyols are produced by reacting organic dibasic acids such as aromatic or aliphatic dibasic acids, e.g., phthalic acid, adipic acid, linolenic acid dimer or maleic acid, etc. with polyhydric alcohols such as ethyleneglycol, propyleneglycol, butyleneglycol or diethylene glycol, trimethylol propane, hexanetriol, glycerine, trimethylol ethane or pentaerythritol, etc. The polyether polyols such as polyoxypropylene glycol, poly-(oxypropylene)-poly-(oxyethylene)glycol, poly-(oxybutylene)glycol, poly-(oxytetramethylene)glycol, poly-(oxypropylene)triol, poly-(oxypropylene)-poly(oxyethylene)triol, or poly-(oxypropylene)-poly-(oxymethylene)poly(oxypropylene)triol are produced by ring-opening polymerization of propylene oxide, ethylene oxide and the like. In carrying out formation of these urethane, the binders are more effective if the above described polyol component of the polyester polyols or the polyether polyols are added in an amount of less than 10 mole% and preferably less than 5 mole% based on the total reaction mixture, because at higher concentrations the modulus of the resulting thermoplastic polyurethane resins becomes too high.

The polyester polyurethanes and polyether polyurethanes which are thermoplastic polyurethane resins having a weight average molecular weight of about 10,000 to 300,000 and, preferably, about 30,000 to 150,000, and having 0 or 1 isocyanate (-NCO) group are advantageously used.

The above described thermoplastic polyurethane resins are described in *Plastic Zairyo Koza* 2, *Polyurethane resin*, (6th ed. published by Nikkankogyo shinbunsha, 30, June 1973), *Gosei Kobunshi* V, pages 309–363 (1st ed. published by Asakurashoten, 15, June 1971) and *Polyurethane* (11th ed. published by Makishoten, 30, June 1968).

The thermoplastic polyurethane resins described above are commercially available, as MORTHANE (CA-250HV, CA-275 and CA-300) by Morton Chemical Co., NIPPORAN (N-2301, N-2302, N-2304, N-3022, N-3109, N-3913, N-3922, N-5032 and N-5033) and PARAPRENE (P-225) by Nippon Polyurethane Industry Co. and CRISVON (5116, 6109, 6208, 6408, 6868, 7209, 7309, 7319 and 8166) by Dainippon Ink & Chemicals Inc., etc.

A preferred mixing ratio by weight of the 2-chloroacrylonitrile polymers to the thermoplastic polyurethane resins in the binder of the present invention is in the range of about 1/9 to 9/1 and preferably about 3/7 to 7/3. Further, the polyisocyanate compounds used together therewith are used in an amount of about 5 to 60 parts by weight, preferably 8 to 40 parts by weight, per 100 parts by weight of the mixture of the above described resins.

The polyisocyanate compounds used in the present invention are isocyanates having at least two isocyanate groups and adducts thereof, examples of which include saturated aliphatic diisocyanates, saturated cycloaliphatic diisocyanates, aromatic isocyanates such as benzene isocyanates, naphthalene isocyanates, biphenylisocyanates, diphenylmethane diisocyanates, triphenylmethanediisocyanates, and adducts thereof.

Examples of the polyisocyanates include isocyanates such as ethanediisocyanate, butanediisocyanate, hexanediisocyanate, 2,2-dimethylpentanediisocyanate, 2,2,4-trimethylpentanediisocyanate, decanediisocyanate, $\omega,\omega'$-diisocyanato-1,3-dimethylbenzene, $\omega,\omega'$-diisocyanate-1,2-dimethylcyclohexanediisocyanate, $\omega,\omega'$-diisocyanato-1,4-diethylbenzene, $\omega,\omega'$-diisocyanato-1,5-dimethylnaphthalene, $\omega,\omega'$-diisocyanato-n-propylbiphenyl, 1,3-phenylenediisocyanate, 1-methylbenzene-2,4-diisocyanate, 1,3-dimethylbenzene-2,6-diisocyanate, naphthalene-1,4-diisocyanate, 1,1'-dinaphthyl-2,2'-diisocyanate, biphenyl-2,4'-diisocyanate, 3,3'-dimethylbiphenyl-4,4'-diisocyanate, diphenylmethane-4,4'-diisocyanate, 2,2'-dimethyldiphenylmethane-4,4'-diisocyanate, 3,3'-dimethoxydiphenylmethane-4,4'-diisocyanate, 4,4'-diethoxydiphenylmethane-4,4'-diisocyanate, tolylenediisocyanate or 1,5-naphthylenediisocyanate, etc., dimers or trimers of these isocyanates and adducts composed of these isocyanates and dihydric or trihydric polyalcohols. Representative adducts are adducts of 3 moles of tolylenediisocyanate and 1 mole of trimethylol propane and 3 moles of hexamethylenediisocyanate and 1 mole of trimethylol propane. Further, adducts suitably selected from those of the above described isocyanates can be used.

The above described binder compositions of the present invention are preferably used in an amount of about 8 to 100 parts by weight, preferably 10 to 80 parts by weight and, particularly, 13 to 50 parts by weight per 100 parts by weight of the finely-divided ferromagnetic powder.

The magnetic layer in the present invention is a coated magnetic layer which is prepared by applying a magnetic coating obtained by mixing a finely-divided ferromagnetic powder with the above described binder, additives and solvents to a non-magnetic support, orienting and drying.

The magnetic layer is preferred to have a dry thickness of about 1 to 18 $\mu$m. But in case of magnetic recording media for digital record reproduction which have a protective layer, those having a thickness up to about 30 $\mu$m can be used. Further, in the case of a multilayer structure, it is preferred that the sum total of the thickness of each layer is in the 1 to 18 $\mu$m range. The dry thickness depends on the use, shape (film, tape, sheet, disk, card or drum, etc.) or a standard of the magnetic recording medium.

The non-magnetic support of magnetic media based on the present invention may be made of polyesters such as polyethylene terephthalate or polyethylene-2,6-naphthalate, etc.; polyolefins such as polyethylene or polypropylene, etc.; cellulose derivatives such as cellulose triacetate, cellulose diacetate, cellulose acetate butyrate or cellulose acetate propionate, etc.; vinyl resins such as polyvinyl chloride or polyvinylidene chloride, etc.; and plastics such as polycarbonate, polyimides or polyamides, etc.; but also non-magnetic metals such as aluminium, copper, tin, zinc or non-magnetic alloys thereof, etc.; ceramics such as glass, porcelain or earthenware, etc.; and papers such as paper or paper coated or laminated with barita or $\alpha$-polyolefins having 2 to 10 carbon atoms such as polyethylene, polypropylene or ethylene-butene copolymer, etc. can be used. These non-magnetic supports may be transparent or opaque depending on their use.

Further, the non-magnetic support may have any shape and a support materials are selected depending upon the use and the shape.

The thickness of these non-magnetic support is in the range of about 2 to about 50 $\mu$m and preferably 3 to 25 $\mu$m in case of films, tapes or sheets. Further, it is in the range of about 20 to about 90 $\mu$m in case of flexible disk sheets (floppy type), and it is in the range of about 0.5 to 10 mm in case of disks or cards. In case that they are drums, they are cylindrical, the type of which can be determined according to a recorder used.

Processes for producing the magnetic coatings used for the above described coated type magnetic layer have been described in detail in Japanese Patent Publications Nos. 15/60, 26794/64, 186/68, 28043/72, 28045/72, 28046/72, 28048/72, 31445/72, 11162/73, 21331/73 and 33683/73, U.S.S.R. Pat. No. 308,033 and U.S. Pat. Nos. 2,581,414, 2,855,156, 3,240,621, 3,526,598, 3,728,262, 3,790,407 and 3,836,383. Magnetic coatings described therein comprise a finely-divided ferromagnetic powder, a binder and an application solvent as main components and sometimes contain other additives such as a dispersing agent, a lubricant, an abrasive or an antistatic agent, etc.

As the above described finely-divided ferromagnetic powder, ferromagnetic iron oxides, ferromagnetic chromium dioxide and ferromagnetic alloy powders can be used.

The ferromagnetic iron oxides are ferromagnetic iron oxides represented by the general formula $FeO_x$ wherein x is $1.33 \leq x \leq 1.50$, namely maghemite ($\gamma$—$Fe_2O_3$, $x=1.50$), magnetite ($Fe_3O_4$, $x=1.33$) and Berthollide compounds of them ($FeO_x$, $1.33 < x < 1.50$). The value x is represented by the formula $$x = \frac{1}{200} \times \left\{ 2 \times \left( \begin{array}{c} \text{atomic \% of} \\ \text{2 valent iron} \end{array} \right) + 3 \times \left( \begin{array}{c} \text{atomic \% of} \\ \text{3 valent iron} \end{array} \right) \right\}$$

To these ferromagnetic iron oxides, divalent metals may be added. As the divalent metals, there are Cr, Mn, Co, Ni, Cu and Zn, which are added in the range of about 0 to 10 atomic % based on the above described iron oxides.

The ferromagnetic chromium dioxide used include $CrO_2$ and $CrO_2$ to which 0 to 20 wt% of metals such as Na, K, Ti, V, Mn, Fe, Co, Ni, Tc, Ru, Sn, Ce or Pb, semiconductors such as P, Sb or Te, or oxides of these metals may be added.

It is effective that the above described ferromagnetic iron oxides and ferromagnetic chromium dioxide have an acicular ratio of about 2/1 to 20/1 and preferably 5/1 or more and 0.2 to 2.0 μm of the average length.

Ferromagnetic alloy powders have a composition comprising 75 wt% or more of metals wherein 80 wt% or more of the metals is at least one ferromagnetic metal (namely, Fe, Co, Ci, Fe-Co, Fe-Ni, Co-Ni or Co-Ni-Fe) and 20 wt% or less and preferably 0.5-5 wt% of the metals is Al, Si, S, Sc, Ti, V, Cr, Mn, Cu, Zn, Y, Mo, Rh, Pd, Ag, Sn, Sb, Te, Ba, Ta, W, Re, Au, Hy, Pb, Bi, La, Ce, Pr, Nd, B or P, which sometimes contain a small amount of water, hydroxides or oxides. The ferromagnetic alloy powders have an acicular ratio of about 5/1 to 20/1 and are about 0.5 μm or less in length. They have been described more specifically in Japanese Patent Publications 5515/61, 4825/62, 5009/64, 10307/64, 14090/69, 18372/70, 22062/72, 22513/72, 28466/71, 38755/71, 4286/72, 12422/72, 17284/72, 18509/72, 18573/72 and 39639/73, U.S. Patents 3,026,215, 3,031,341, 3,100,194, 3,242,005, 3,389,014, 3,898,952, 3,913,131, 3,917,716, 3,929,604, 3,943,013, 3,966,510, 4,002,804, 4,007,072, 4,009,111, 4,015,030, 4,016,057, 4,020,236, 4,063,000, 4,066,564, 4,066,565, 4,069,164, 4,076,861 and 4,096,316, British Patents 752,659, 782,762 and 1,007,323, French Patent 1,107,654 and German patent application (OLS) No. 1,281,334.

Dispersing agents, lubricants, abrasives and antistatic agents may be added to the magnetic layer as additives in addition to the above described binder and ferromagnetic finely-divided powder.

As the dispersing agents, it is possible to use aliphatic acids having 12 to 18 carbon atoms ($R_1COOH$, where $R_1$ is an alkyl or alkenyl group having 11 to 17 carbon atoms) such as caprylic acid, capric acid, lauric acid, myristic acid, palmitic acid, stearic acid, oleic acid, elaidic acid, linolic acid, linolenic acid or stearolic acid, etc., metal soaps comprising alkali metal (Li, Na and K) salts or alkaline earth metal (Mg, Ca and Ba) salts of the above described aliphatic acids, fluorine containing compounds of esters of the above described aliphatic acids, amides of the above described aliphatic acids, polyalkylene oxide alkyl phosphoric acid esters, lecithin, and trialkyl-polyolefinoxy quaternary ammonium salts (the alkyl has 1 to 5 carbon atoms and the olefin is ethylene or propylene, etc.). In addition, higher alcohols having 12 or more carbon atoms and sulfuric acid esters thereof can be used. These dispersing agents are added in the range of about 0.5 to 20 parts by weight per 100 parts by weight of the binder. They have been described in Japanese Patent Publications Nos. 28369/64, 17945/69, 7441/73, 15001/73, 15002/73, 16363/73 and 4121/75 and U.S. Patents 3,387,993 and 3,470,021.

As the lubricants, it is possible to use silicone oils such as dialkyl polysiloxanes (where the alkyl group has 1 to 5 carbon atoms), dialkoxy polysiloxanes (where the alkoxy group has 1 to 4 carbon atoms), monoalkyl monoalkoxy polysiloxanes (where the alkyl group has 1 to 5 carbon atoms and alkoxy has 1 to 4 carbon atoms), phenyl polysiloxanes or fluoroalkyl polysiloxanes (where the alkyl group has 1 to 5 carbon atoms), etc., electroconductive finely-divided powder such as graphite, finely-divided inorganic powders such as molybdenum disulfide or tungsten disulfide, etc., finely-divided plastic powders such as polyethylene, polypropylene, ethylene-vinyl chloride copolymer or polytetrafluoroethylene, etc., α-olefin polymers unsaturated aliphatic hydrocarbons which are liquid at a room temperature (compounds having a n-olefinic double bond in the end carbon; carbon atom number: about 20), aliphatic acid esters composed of monobasic aliphatic acids having 12 to 20 carbon atoms and monohydric alcohols having 3 to 12 carbon atoms, and fluorocarbons. These lubricants are added in the range of 0.2 to 20 parts by weight per 100 parts by weight of the binder. They have been described in Japanese Patent Publications Nos. 29709/59, 11033/63, 23889/68, 40461/71, 15621/72, 18482/72, 28043/72, 30207/72, 32001/72, 7442/73, 14247/74, 5042/75, 14082/77, 18561/77, 8804/77, 49803/77, 49804/77, 49805/77, 67304/77, 70811/77, 19004/78 and 24806/78, U.S. Pat. Nos. 2,654,681, 3,470,021, 3,492,235, 3,497,411, 3,523,086, 3,625,760, 3,630,772, 3,634,253, 3,642,539, 3,687,725, 3,996,407, 4,007,313, 4,007,314, 4,018,967, 4,018,968, 4,110,503 and 4,135,016, "IBM Technical Disclosure Bulletin" Vol. 9, No. 7, page 779 (Dec. 1966) and "ELECTRONIK" 1961, No. 12, page 380.

As the abrasives, it is possible to use conventionally used materials such as fused alumina, silicon carbide, chromium oxide ($Cr_2O_3$), corundum, artificial corundum, diamond, artificial diamond, garnet or emery (main component: corundum and magnetite), etc. These abrasives have 5 or more of the Mohs hardness and 0.05 to 5μ and preferably 0.1 to 2μ of the average particle size. These abrasives are added in the range of 0.5–20 parts by weight per 100 parts by weight of the binder. They have been described in Japanese Patent Publications Nos. 18572/72, 15003/73, 15004/73 (U.S. Pat. Nos. 3,617,368), 39402/74 and 9401/75, U.S. Pat. Nos. 3,007,807, 3,041,196, 3,293,066, 3,630,910, 3,687,725 and 4,015,042, British Pat. No. 1,145,349 and German Patents (DT-PS) Nos. 853,211 and 1,101,000.

As the antistatic agents, it is possible to use finely-divided electroconductive powders such as of carbon black or carbon black graft polymers, etc., natural surface active agents such as saponin, etc., nonionic surface active agents such as alkylene oxide type, glycerine type or glycidol type agents, etc., cationic surface active agents such as higher alkylamines, quaternary ammonium slats, heterocyclic compounds including pyridine, phosphoniums or sulfoniums, etc., anionic surface active agents containing acid groups such as carboxylic acid, sulfonic acid, phosphoric acid, sulfuric acid ester and phosphoric acid estr groups, and ampholytic surface active agents such as amino acids, aminosulfonic acids, or sulfuric or phosphoric acid esters of aminoalcohols, etc.

The above described finely-divided electroconductive powders are added in the range of 0.2 to 20 parts by weight per 100 parts by weight of the binder and the surface active agents are added in the range of 0.1 to 10 parts by weight per 100 parts by weight of the binder.

Some examples of these finely-divided electroconductive powder and surface active agents capable of use as antistatic agents have been described in Japanese Patent Publications Nos. 22726/61, 24881/72, 26882/72, 15440/73 and 26761/73, Japanese patent applications (OPI) Nos. 18561/77 and 38201/77, U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,443,654, 3,475,174 and 3,545,974, German patent application (OLS) No. 1,942,665, British Pat. Nos. 1,077,317 and 1,198,450 as well as "Kaimenkasseizai no Gosei to sono Oyo" written by Ryohei Oda (Maki Shoten Co. 1965), "Surface Active Agents" written by A. M. Schwartz and J. W. Perry (Interscience Publication Incorporated, 1958), "Encyclopedia of Surface Active Agents" vol. 2, written by J. P. Sisly (Chemical Publish Company, 1964) and "Kaimenkasseizai Binran" 6th print (Sangyo Tosho Co., Dec. 20, 1966).

These surface active agents may be added alone or as mixtures thereof. Although they are used as the antistatic agents, they are sometimes used for other purposes, for example, for dispersion, improvement of magnetic characteristics or improvement of a lubricating property or as application assistants.

As organic solvents used as the application solvents it is possible to use ketones such as acetone, methyl ethyl ketone, methyl isobutyl ketone or cyclohexanone, etc., alcohols such as methanol, ethanol, propanol or butanol, etc., esters such as methyl acetate, ethyl acetate, butyl acetate, ethyl lactate or glycol monoethyl ether acetate, etc., tars (aromatic hydrocarbons) such as benzene, toluene or xylene, etc. and chorinated hydrocarbons such as methylene chloride, ethylene chloride, carbon tetrachloride, chloroform, ethylene chlorohydrin or dichlorobenzene, etc.

The magnetic powder and the above described binder, dispersing agent, lubricant, abrasive, antistatic agent and solvent are mixed to produce a magetic coating composition.

In carrying out mixing, the magnetic powder and all the above described components are charged into a mixing apparatus at the same time or in turn. For example, there the magnetic powder may be added to a solvent containing a dispersing agent and mixed for a desired time to produce a magnetic coating.

In carrying out dispersion by mixing the magnetic coating, various mixing apparatus are used. For example, there is a two roll mill, a three roll mill, a ball mill, a pebble mill, a trommel mill, a sand grinder, a Szegvari attritor, a high-speed impeller dispersing machine, a high speed stone mill, a high speed impact mill, a disper, a kneader, a high-speed mixer, a homogenizer or an ultrasonic dispersing apparatus, etc.

Techniques concerning dispersion by mixing have been described in "Paint Flow and Pigment Dispersion" written by T. C. Patton (John Wiley & Sons Co., 1964) and U.S. Pat. Nos. 2,581,414 and 2,855,156.

In order to apply the above described magnetic recording layer to the base, it is possible to utilize air doctor coating, blade coating, air-knife coating, squeeze coating, dip coating, reverse roll coating, transfer roll coating, gravure coating, kiss coating, cast coating, spray coating, spin coating and other methods, which have been described in detail in "Coating Kogaku" pages 253–277, published by Asakura Shoten Co. (Mar. 20, 1971).

Further, in case of multilayer magnetic recording materials, two magnetic layers are provided by a continuous coating operation which comprises repeating a step comprising applying a magnetic layer to a nonmagnetic base by the above described coating method and drying it. Further, two magnetic layers may be provided at the same time by a multilayer simultaneous coating method described in Japanese Patent Applications (OPI) 98803/73 (German Pat. DT-OS No. 2,309,159) and 99233/73 (German Pat. DT-AS No. 2,309,158).

The magnetic layer applied to the base by the above desribed methods is then dried after subjecting to, if necessary, an orientation treatment of the magnetic powder in the layer. Further, if necessary, the magnetic layer is subjected to a surface smoothening processing or the product is cut in a desired shape to produce the magnetic recording materials of the present invention.

It has been found that, when the magnetic recording layer is subjected to the surface smoothening processing, a magnetic recording material having a smooth surface and excellent abrasion resistance can be obtained. This surface smoothing processing can be carried out by smoothening before drying or by calendering after drying.

The orientation treatment is carried out under the following condition.

The orienting magnetic field has a strength of about 500 to 3000 Oe in alternating current or direct current.

The direction of orientation of the magnetic material is determined according to its use. Namely, in case of sound tapes, small-sized video tapes or memory tapes, orientation is carried out in a direction parallel to the lengthwise direction of the tape. In case of broadcasting video tapes, the orientation is carried out at 30° to 90° of inclination to the lengthwise direction.

Methods of orientation of the magnetic powder have been described in the following patents. For examples, U.S. Pat. Nos. 1,949,840, 2,796,359, 3,001,891, 3,172,776, 3,416,949, 3,473,960 and 3,681,138 and Japanese Patent Publications Nos. 3427/57, 28368/64, 23624/65, 23625/65, 13181/66, 13043/73 and 39722/73. Further, in case of multilayer structure, as described in Japanese patent application (OPI) No. 79905/77, U.S. Pat. No. 3,775,178 and German Patent Publication (DT-AS) No. 1,190,985, orientation of the upper layer and that of the lower layer may be carried out in different directions from each other.

The drying temperature of the magnetic layer after orientation is about 50° to 120° C., preferably 70° to 100° C. and particularly 80° to 90° C. The air flux is 1 to 5 kl/m$^2$ and preferably 2 to 3 kl/m$^2$ and the drying time is about 30 seconds to 10 minutes and preferably 1 to 5 minutes.

In carrying out the smoothening processing before drying of the magnetic layer, a magnet smoother, a smoothening coil, a smoothening blade or a smoothening blanket, etc. is used. They have been described in Japanese Patent Publication No. 38802/72, British Pat. No. 1,191,424, Japanese Patent Publication No. 11336/73 and Japanese patent applications (OPI) Nos. 53631/74, 112005/75, 77303/76, 151005/77 and 13404/78.

The calendering of the coated surface after drying the magnetic layer is preferred to carry out by a supercalender method which comprises passing between two rolls such as a metal roll and a cotton roll, a synthetic resin roll (for example, nylon or polyurethane, etc.) or a metal roll and a metal roll. The supercalendering is preferred to carry out under the condition, namely, under about 25 to 50 kg/cm of roll pressure, at about 35° to 150° C. of the temperature and at 5 to 200 m/min of the processing rate. If the temperature and the pressure become higher than the above described ranges, there is a bad influence upon the magnetic layer and the non-magnetic base. Further, if the processing rate is lower than about 5 m/min, the effect of surface smoothening can not be obtained and, if it is higher than about 200 m/min, the processing operation becomes difficult.

These surface smoothening processings have been described in U.S. Pat. Nos. 2,688,567, 2,998,325 and 3,783,023, German patent application (OLS) No. 2,405,222, Japanese patent applications (OPI) Nos. 53631/74, 10337/75, 99506/75, 92606/76, 10204/76 and 103404/76 and Japanese Patent Publication No. 17404/77.

Further, the base of the present invention may be back-coated on the reverse face (back face) to the magnetic layer side for the purpose of prevention of electrostatic charges, prevention of transfer, prevention of improvement of strength of the magnetic recording material, or matting of the back face.

This back layer is provided by applying a coating solution which is prepared by mixing at least one of the above described lubricants, abrasives and antistatic agents and, if necessary, dispersing agents for uniformly dispersing them with a known binder for magnetic recording media and an application solvent, to the back of the base, and drying. Either the magnetic layer or the back layer may be provided first to the base.

Preferred additives conventionally used include carbon black, graphite, talc, $Cr_2O_3$, $\alpha$—$Fe_2O_3$ (rouge and hematite) and silicone oils, etc. As the binder, thermosetting resins are preferred.

In case that the additives are inorganic compounds, they are mixed in the ratio of about 30 to 85 wt% and preferably 40 to 80 wt% based on the whole solid content of the back layer. In case that the additives are organic compounds, they are mixed in the ratio of about 0.1 to 30 wt% and preferably 0.2 to 20 wt% based on the whole solid content of the back layer. Further, the dry thickness can be suitably selected in the range of about 0.5 to 5.0 μm according to the whole thickness, use or shape of the magnetic recording material.

The above described back-coating has been described in, for example, Japanese Patent Publications Nos. 13411/77 and 17401/77, Japanese patent application (OPI) No. 150407/75, 14460/76, 8003/77, 8005/77, 8006/77, 17003/77, 25603/77, 30403/77, 37405/77, 40303/77, 40304/77, 96505/77, 102004/77, 42706/78 and 42707/78, Japanese Utility Model Publications Nos. 6268/77 and 8419/77, Japanese Utility Model Registration Applications (OPI) Nos. 13411/77 and 17401/77 and U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 31115,420, 3,166,688 and 3,761,311.

The above described magnetic recording media of the present invention show the following effects.

(i) The abrasion resistance at a high temperature and a high humidity (45° C., 80% RH) is excellent.

(ii) The coefficient of friction of the tape is low and running of the tape is stable.

(iii) The dispersibility of magnetic particles is good and the magnetic layer has an good rectangular ratio.

(iv) The spontaneous combustion does not occur in the production step.

(v) Tapes having a high modulus of elasticity can be produced.

(vi) The magnetic coating solution is subject to less aggregation and has good storage stability (long pot life).

(vii) The magnetic recording media are particularly suitable of tapes for video cassettes.

(viii) The magnetic recording media can be applied to audio tapes, magnetic sheets or digital tapes.

In the following, the present invention is illustrated in greater detail with reference to the following examples and comparison examples. It will be understood by persons skilled in the art that the components, ratios, and order of operations shown in the examples can be varied without departing from the scope and the spirit of the present invention.

In the following examples and comparisons, all parts are by weight.

EXAMPLE 1

| Magnetic Coating Composition I | Parts |
| --- | --- |
| A. γ-$Fe_2O_3$ (Coercive force (Hc): 450 Oe, particle size: 0.6 × 0.07 × 0.07 μm) | 300 |
| B. 2-Chloroacrylonitrile polymer (Average molecular weight: 58,000) | 30 |
| C. Thermoplastic polyurethane resin (Reaction product of butanediol, adipic acid and toluene diisocyanate, average molecular weight: 150,000; content of —NCO group:0) | 40 |
| D. Electroconductive carbon black (average particle size: 30 milli-μm) | 20 |
| E. Oleic acid | 3 |
| F. Lecithin | 3 |
| G. Solvent composed of methyl ethyl ketone (MEK)/ toluene mixture (ratio by weight of the mixture: 1/1) | 700 |

The above described composition was adequately mixed by a ball mill to disperse them. After dispersion, 7 parts of a 75 wt% solution of (H) a polyisocyanate compound which was prepared by addition reaction of 3 mols of toluenediisocyanate and 1 mol of trimethylolpropane in ethyl acetate (Desmodur L-75, produced by Bayer A. G.) and 200 parts of the solvent composed of MEK/toluene in the above described mixing ratio were added, and the mixture was mixed to produce Magnetic Coating Composition I. It was applied to a polyester base 25 μm thick so as to have a dry thickness of 10 μm.

This broad magnetic web was slit into ½ inch widths to produce magnetic tapes. (Sample No. 1).

Magnetic tapes having ½ inch widths were produced in the same manner as Sample No. 1 except that Magnetic Coating Composition II, III, IV and V in which the finely-divided ferromagnetic powder (A), the 2-chloroacrylonitrile polymer (B), the thermoplastic polyurethane resin (C) and the polyisocyanate compound (H) in amounts shown in Table 1 were used instead of Magnetic Coating Composition I. They are Sample Nos. 2, 3, 4 and 5 respectively.

TABLE 1

| Sample No. | Magnetic Coating Composition | (A) Finely-divided Ferromagnetic Powder (300 parts) | (B) 2-Chloroacrylonitrile Polymer Molecular Weight (amount) | (C) Thermoplastic Polyurethane Resin (amount) | (H) Polyisocyanate Compound (amount) |
|---|---|---|---|---|---|
| 2 | II | Fe—Co alloy [90:10 (atomic ratio), Hc: 600 Oe, average particle size: 40 milli - $\mu$m] | 100,000 (40 parts) | Reaction product of butyleneadipate and diphenylmethanediisocyanate; molecular weight: 130,000; content of —NCO group: 0 (30 parts) | Desmodur L-75 (18 parts) |
| 3 | III | Co containing FeO [x: 1.42, Hc: 620$^x$Oe, Co content: 1.5 atomic %, particle size: 0.5 × 0.06 × 0.06 ($\mu$m)] | 30,000 (50 parts) | Reaction product of butylenediadipate, neopentyladipate and diphenylmethane diisocyanate, molecular weight: 100,000; content of —NCO group: 0 (20 parts) | Desmodur L-75 (7 parts) |
| 4 | IV | Co containing $\gamma$-Fe$_2$O$_3$ [Hc: 580 Oe, Co content: 3.0 atomic %, particle size: 0.4 × 0.06 × 0.06 ($\mu$m)] | 58,000 (60 parts) | Reaction product of butyleneadipate and toluenediisocyanate, molecular weight: 150,000; content of —NCO group: 0 (10 parts) | Addition product of 1 mol of trimethylol propane and 3 mols of hexamethylene diisocyanate (5 parts) |
| 5 | V | CrO$_2$ [Hc: 550 Oe, particle size: 0.9 × 0.13 × 0.13 ($\mu$m)] | 40,000 (35 parts) | Reaction product of hexaneadipate and toluenediisocyanate, molecular weight: 100,000; content of —NCO group: 0 (35 parts) | Addition product of 1 mol of trimethylol propane and 3 mols of hexamethylene diisocyanate (40 parts) |

COMPARISON EXAMPLE 1

Magnetic tapes having ½ inch widths were produced in the same manner as Sample Nos. 1 to 5 except that materials shown in the following Table 2 were used instead of 2-chloroacrylonitrile polymer (B) and thermoplastic polyurethane resin (C) in Magnetic Coating Compositions I–V in Example 1. They are Sample Nos. C-1, C-2, C-3, C-4 and C-5.

TABLE 2

| Sample No. | Magnetic Coating Composition | (B) Binder Component (amount) | (C) Binder Component (amount) |
|---|---|---|---|
| C - 1 | C - I | Vinyl chloride-vinyl acetate copolymer (copolymerization ratio: 87:13 (ratio by weight), average degree of polymerization: 450)(30 parts) | The same as that in Magnetic Coating Composition I (40 parts) |
| C - 2 | C - II | Nitrocellulose (Regular Soluble) type, viscosity: RS ½(sec.)) (40 parts) | The same as that in Magnetic Coating Composition II (30 parts) |
| C - 3 | C - II | 2-Chloroacrylonitrile polymer (the same as that in Magnetic Coating Composition III) (70 parts) | None |
| C - 4 | C - IV | Vinylidene chloride-acrylonitrile copolymer (Saran F-310, produced by Asahi Dow Ltd.) (60 parts) | The same as that in Magnetic Coating Composition IV (10 parts) |
| C - 5 | C - V | Polyurethane resin (Reaction product of butylene adipate and toluene diisocyanate; average molecular weight: 100,000; content of —NCO group: 0) (35 parts) | The same as that in Magnetic Coating Composition V (35 parts) |

½ inch magnetic tapes of Sample Nos. 1, 2, 3, 4, 5, C-1, C-2, C-3, C-4 and C-5 were set in cassettes for VHS. The video sensitivity, the video signal to noise ratio and the abrasion resistance were measured using a video cassette recorder (Type NV-8800, produced by Matsushita Electric Industrial Co.) and they were compared. The results are shown in Table 3.

TABLE 3

| Sample No. | Video Sensitivity[1] (dB) | Video S/N[2] (dB) | Decrease of output after running 100 times[3] (indication of abrasion resistance) (dB) |
|---|---|---|---|
| 1 | +2.1 | +2.0 | −0.4 |
| 2 | +1.8 | +1.3 | −0.3 |
| 3 | +1.4 | +1.4 | −0.6 |
| 4 | +0.9 | +1.0 | −0.4 |
| 5 | +1.6 | +1.2 | −0.3 |
| C - 1 | ±0 | ±0 | −2.4 |
| C - 2 | −0.3 | −0.2 | −3.1 |
| C - 3 | −0.4 | −0.3 | −2.0 |
| C - 4 | −0.2 | −0.4 | −1.9 |
| C - 5 | ±0 | −0.3 | −2.3 |

[1] Video sensitivity (dB): relative value taking video sensitivity of Sample No. C - 1 as the standard (O db).
[2] Video S/N (dB): relative value taking the video S/N of Sample No. C - 1 as the standard (O dB).
[3] Decrease of output after running 100 times (dB) is the decrease of output after running 100 times taking the initial output of each sample as the standard (O dB).

It is understood from the above described results that, in magnetic recording materials using the binder components of the present invention both the video sensitivity and the video signal to noise ratio are excellent. Further, when the decrease in output is measured by running 100 times ½ inch tapes having 3 minute length (about 6 meters) in order to compare the abrasion resistance, the decrease of output is $-1.9$ to $-3.1$ dB in case of the binder composition of Comparison Example but it is $-0.3$ to $0.6$ dB in case of the binder compositions of the present invention, which shows that the binders of the present invention are excellent as compared with prior binders.

While the invention has been described in detail and with reference to specific embodiments thereof, it will be apparent to one skilled in the art that various changes and modifications can be made therein without departing from the spirit and scope thereof.

What is claimed is:

1. In a magnetic recording medium comprising a nonmagnetic support and a recording layer comprising a finely divided ferromagnetic powder dispersed in a binder, the improvement wherein said binder comprises a 2-chloroacrylonitrile polymer and a thermoplastic polyurethane.

2. The magnetic recording medium of claim 1, wherein said binder additionally contains a polyisocyanate compound.

3. The magnetic recording medium of claims 1 or 2, wherein said binder is present in an amount of about 10 to 80 parts by weight per 100 parts by weight finely divided ferromagnetic powder.

4. The magnetic recording medium of claim 2, wherein said polyisocyanate is an aliphatic diisocyanate, a cycloaliphatic diisocyanate, or an aromatic diisocyanate, and adducts thereof.

5. The magnetic recording medium of claim 2, wherein said polyisocyanate is present in an amount of about 5 to 60 parts by weight per 100 parts by weight of the mixture of 2-chloroacrylonitrile and the polyurethane.

6. The magnetic recording medium of claim 1, wherein said 2-acrylonitrile polymer has a weight average molecular weight of about 10,000 to 300,000.

7. The magnetic recording medium of claim 1, wherein said thermoplastic polyurethane is a polyester polyurethane or a polyether polyurethane.

8. The magnetic recording medium of claim 1, wherein said polyurethane has a weight average molecular weight of about 10,000 to 300,000.

9. The magnetic recording medium of claim 1, wherein said 2-chloroacrylontrile polymer and said polyurethane resin are present in a weight ratio of about 1:9 to 9:1.

10. The magnetic recording medium of claim 9, wherein said 2-chloroacrylonitrile polymer and said thermoplastic polyurethane are present in a weight ratio of about 3:7 to 7:3.

11. The magnetic recording medium of claim 1, wherein said 2-chloroacrylonitrile polymer is a homopolymer or a copolymer of 2-chloroacrylonitrile and up to 30 mol% of a monomer selected from the group consisting of vinyl chloride, vinyl acetate, vinylidene chloride, acrylonitrile, and an alkyl ($C_{1-8}$) acrylate or methacrylate.

12. The magnetic recording medium of claim 11, wherein said acrylate or methacrylate is ethyl acrylate, propyl acrylate, butyl acrylate, amyl acrylate, heptyl acrylate, methyl methacrylate, ethyl methacrylate, propyl methacrylate, butyl methacrylate, amyl methacrylate, hexyl methacrylate, heptyl methacrylate or octyl methacrylate.

13. A magnetic coating composition comprising a finely-divided ferromagnetic powder, 2-chloroacrylonitrile polymer and a thermoplastic polyurethane resin.

14. The magnetic coating composition of claim 13, wherein said binder additionally contains a polyisocyanate compound.

15. The magnetic coating composition of claim 13 or 14, wherein said binder is present in an amount of about 10 to 80 parts by weight per 100 parts by weight finely divided ferromagnetic powder.

16. The magnetic coating composition of claim 14, wherein said polyisocyanate is an aliphatic diisocyanate, a cycloaliphatic diisocyanate, or an aromatic diisocyanate, and adducts thereof.

17. The magnetic coating composition of claim 14, wherein said polyisocyanate is present in an amount of about 5 to 60 parts by weight per 100 parts by weight of the mixture of 2-chloroacrylonitrile and the polyurethane.

18. The magnetic coating composition of claim 13, wherein said 2-chloroacrylonitrile polymer is a homopolymer or a copolymer of 2-chloroacrylonitrile and up to 30 mol% of a monomer selected from the group consisting of vinyl chloride, vinyl acetate, vinylidene chloride, acrylonitrile, and an alkyl ($C_{1-8}$) acrylate or methacrylate.

19. The magnetic coating composition of claim 18, wherein said acrylate or methacrylate is ethyl acrylate, propyl acrylate, butyl acrylate, amyl acrylate, hexyl acrylate, heptyl acrylate, methyl methacrylate, ethyl methacrylate, propyl methacrylate, butyl methacrylate, amyl methacrylate, hexyl methacrylate, heptyl methacrylate or octyl methacrylate.

20. The magnetic coating composition of claim 13, wherein said 2-acrylonitrile polymer has a weight average molecular weight of about 10,000 to 300,000.

21. The magnetic coating composition of claim 13, wherein said thermoplastic polyurethane is a polyester polyurethane or a polyether polyurethane.

22. The magnetic coating composition of claim 13, wherein said polyurethane has a weight average molecular weight of about 10,000 to 300,000.

23. The magnetic coating composition of claim 13, wherein said 2-chloroacrylonitrile polymer and said polyurethane resin are present in a weight ratio of about 1:9 to 9:1.

24. The magnetic coating composition of claim 23, wherein said 2-chloroacrylonitrile polymer and said thermoplastic polyurethane are present in a weight ratio of about 3:7 to 7:3.

* * * * *